US012645553B2

(12) United States Patent
Chen et al.

(10) Patent No.: US 12,645,553 B2
(45) Date of Patent: Jun. 2, 2026

(54) APPARATUS AND METHOD FOR PERFORMING DEBUG CONTROL IN CHIP

(71) Applicant: Realtek Semiconductor Corp., HsinChu (TW)

(72) Inventors: Yung-Cheng Chen, HsinChu (TW); Ting-Shuo Hsu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 354 days.

(21) Appl. No.: 18/391,680

(22) Filed: Dec. 21, 2023

(65) Prior Publication Data

US 2024/0211359 A1     Jun. 27, 2024

(30) Foreign Application Priority Data

Dec. 27, 2022    (TW) .................................. 111150147

(51) Int. Cl.
G06F 11/00         (2006.01)
G06F 11/07         (2006.01)
G06F 11/22         (2006.01)

(52) U.S. Cl.
CPC ........ G06F 11/2236 (2013.01); G06F 11/076 (2013.01); G06F 11/0772 (2013.01)

(58) Field of Classification Search
CPC ............. G06F 11/3636; G06F 11/3476; G06F 11/3466; G06F 11/0757; G06F 11/076; G06F 11/2236
See application file for complete search history.

(56) References Cited

U.S. PATENT DOCUMENTS

| | | | |
|---|---|---|---|
| 5,367,550 A | 11/1994 | Ishida | |
| 7,055,117 B2 * | 5/2006 | Yee ................... | G01R 31/31727 |
| | | | 716/113 |
| 2005/0010908 A1 * | 1/2005 | Funk ................... | G06F 11/3648 |
| | | | 717/124 |
| 2007/0079177 A1 * | 4/2007 | Spirakis ................ | G06F 11/348 |
| | | | 714/34 |
| 2016/0062862 A1 * | 3/2016 | Moyer ................ | G06F 11/1048 |
| | | | 714/33 |

* cited by examiner

*Primary Examiner* — Charles Ehne
(74) *Attorney, Agent, or Firm* — Winston Hsu

(57)                ABSTRACT

An apparatus and a method for performing debug control in a chip are provided, wherein the apparatus includes a first counter, a first determination circuit, a second counter and a second determination circuit. The first counter counts a number of execution times of a specific system request in the chip to generate a first counting result, and the first determination circuit generates a first determination result according to the first counting result. The second counter counts a number of cycles of an execution clock to generate a second counting result, and the second determination circuit generates a second determination result according to the second counting result. When the first determination result indicates that the first counting result reaches a first threshold and the second determination result indicates that the second counting result reaches a second threshold, execution of the chip is suspended at a breakpoint state.

18 Claims, 4 Drawing Sheets

Instruction pipeline

4T

Data cache

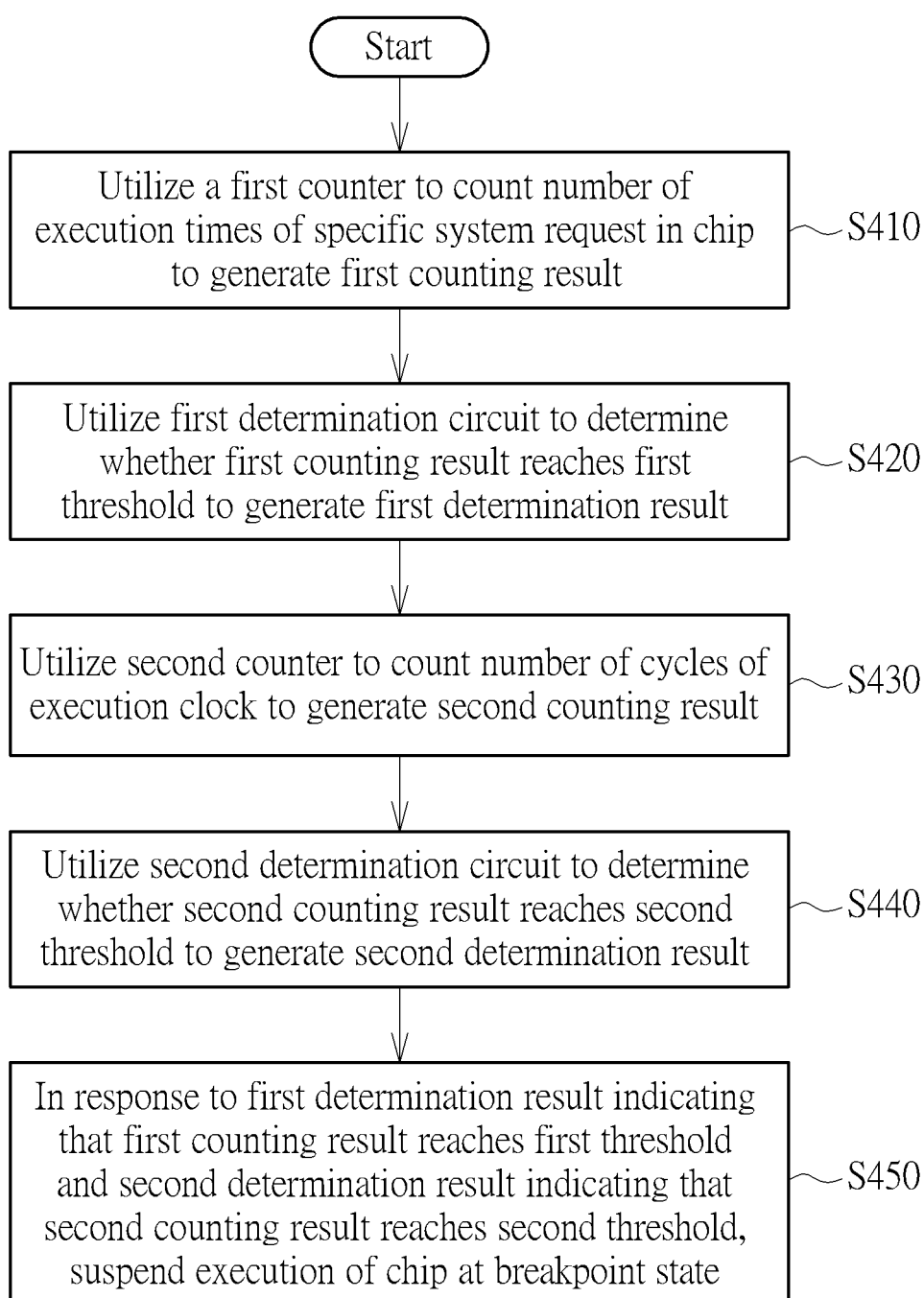

Start

Utilize a first counter to count number of execution times of specific system request in chip to generate first counting result ⌁ S410

Utilize first determination circuit to determine whether first counting result reaches first threshold to generate first determination result ⌁ S420

Utilize second counter to count number of cycles of execution clock to generate second counting result ⌁ S430

Utilize second determination circuit to determine whether second counting result reaches second threshold to generate second determination result ⌁ S440

In response to first determination result indicating that first counting result reaches first threshold and second determination result indicating that second counting result reaches second threshold, suspend execution of chip at breakpoint state ⌁ S450

FIG. 4

APPARATUS AND METHOD FOR PERFORMING DEBUG CONTROL IN CHIP

BACKGROUND OF THE INVENTION

1. Field of the Invention

The present invention is related to system debugging, and more particularly, to an apparatus and a method for performing debug control in a chip.

2. Description of the Prior Art

For the purpose of performing a system debug, in addition to a function mode, a chip may utilize a scan chain with a scan mode to dump information in the chip at a specific state, such that further analysis and debugging can be performed. Related art methods need to switch to the scan mode after the function mode is executed for a few clock cycles, however. As the scan chain can be lengthy, multiple clock cycles may be required in order to completely obtain transient data in the chip. More particularly, when a system reports an error, the related arts typically need to iteratively switch operations between the function mode and the scan mode to obtain transient data corresponding to operation errors of the chip for further analysis, which is time consuming. In addition, hardware errors which occur in the chip are not always stuck-at-fault. Thus, values of the transient data captured by the related art methods may be different from those obtained under a condition of actual execution, and this may lead to a wrong debug direction.

In order to solve the problems mentioned above, trace buffers or check codes within small functional units can be added. Increasing a number of trace buffers may greatly increase additional hardware costs, while fine-locating of a debug procedure is not solved by adding check codes.

Thus, there is a need for a novel debug apparatus and an associated method in order to improve efficiency of the debug procedure without introducing any side effect or in a way that is less likely to introduce side effects.

SUMMARY OF THE INVENTION

An objective of the present invention is to provide an apparatus and a method for performing debug control in a chip, which makes execution of the chip be accurately suspended at a designated or wanted state, in order to improve the efficiency of the debug procedure.

At least one embodiment of the present invention provides an apparatus for performing debug control in a chip. The apparatus comprises a first counter, a first determination circuit, a second counter and a second determination circuit, wherein the first determination circuit is coupled to the first counter, the second counter is coupled to the first determination circuit, and the second determination circuit is coupled to the second counter. The first counter is configured to count a number of execution times of a specific system request in the chip to generate a first counting result. The first determination circuit is configured to determine whether the first counting result reaches a first threshold to generate a first determination result. The second counter is configured to count a number of cycles of an execution clock to generate a second counting result. The second determination circuit is configured to determine whether the second counting result reaches a second threshold to generate a second determination result. In addition, when the first determination result indicates that the first counting result reaches the first threshold and the second determination result indicates that the second counting result reaches the second threshold, execution of the chip is suspended at a breakpoint state.

At least one embodiment of the present invention provides a method for performing debug control in a chip. The method comprises: utilizing a first counter to count a number of execution times of a specific system request in the chip to generate a first counting result; utilizing a first determination circuit to determine whether the first counting result reaches a first threshold to generate a first determination result; utilizing a second counter to count a number of cycles of an execution clock to generate a second counting result; utilizing a second determination circuit to determine whether the second counting result reaches a second threshold to generate a second determination result; and in response to the first determination result indicating that the first counting result reaches the first threshold and the second determination result indicating that the second counting result reaches the second threshold, suspending execution of the chip at a breakpoint state.

The apparatus and the method provided by the embodiment of the present invention can make the execution of the chip be suspended at a designated state via settings of the first threshold and the second threshold. For example, a target suspend state of the chip can be defined by a number of execution times of a specific system request and a number of clock cycles of executing the specific system request. In comparison with the related arts, the present invention can make internal execution of the chip be suspended at a designated breakpoint (e.g. an execution breakpoint corresponding to an error reported by the chip) more quickly, which is beneficial for obtaining transient data associated with the error reported by the chip.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a working flow of a method for performing debug control in a chip according to an embodiment of the present invention.

DETAILED DESCRIPTION

Figure 1:
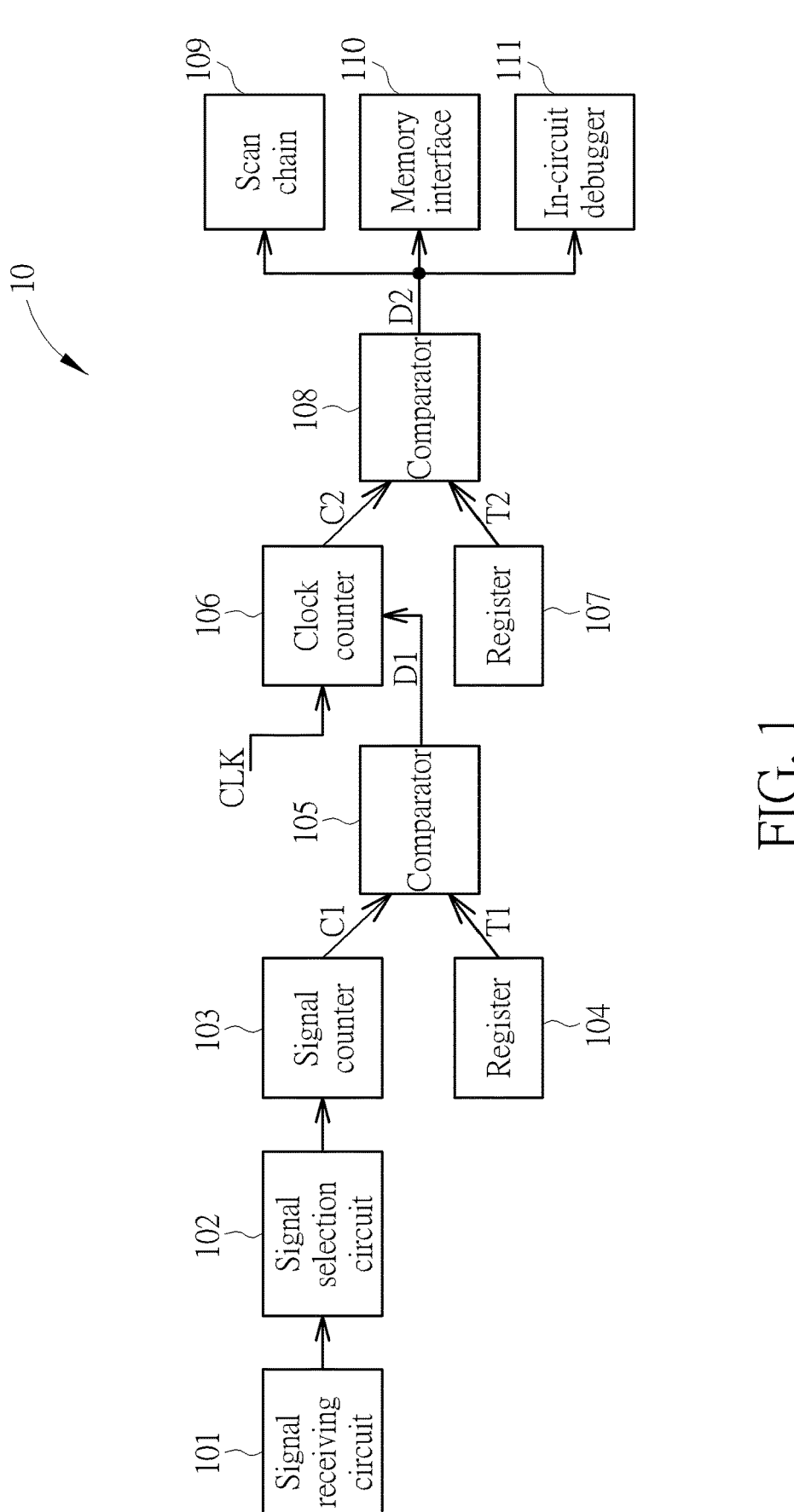
FIG. 1 is a diagram illustrating an apparatus for performing debug control in a chip according to an embodiment of the present invention.

FIG. 1 is a diagram illustrating an apparatus 10 for performing debug control in a chip according to an embodiment of the present invention, where the apparatus 10 may be installed in an electronic device, and may be coupled to one or more functional blocks such as central processing units (CPUs), a cache, a bus, and a dynamic random access memory (DRAM). Examples of the chip may include, but are not limited to: a CPU, a digital signal processing (DSP) chip, a graphic processing unit (GPU) and a general intellectual property within the electronic device. In some embodiment, the apparatus 10 may be installed inside the chip, but the present invention is not limited thereto. As shown in FIG. 1, the apparatus 10 may comprise a first counter such as a signal counter 103, a first determination circuit such as a comparator 105, a second counter such as a clock counter 106, and a second determination circuit such as a comparator 108, where the comparator 105 is coupled to the signal counter 103, the clock counter 106 is coupled to the comparator 105, and the comparator 108 is coupled to the clock counter 106. In this embodiment, the apparatus 10 may further comprise a signal receiving circuit, a signal selection circuit 102, registers 104 and 107, a scan chain 109, a memory interface 110 and an in-circuit debugger 111, where the signal selection circuit 102 is coupled between the signal receiving circuit 101 and the signal counter 103, the registers 104 and 107 are coupled to the comparators 105 and 108, respectively, and the scan chain 109, the memory interface and the in-circuit debugger 111 are coupled to the comparator 108.

In this embodiment, the signal receiving circuit 101 is configured to receive multiple system signals (e.g. instruction load signals, instruction store signals, instruction branch signals, program counter write signals, instruction executed signals, exception taken signals, exception return signals, procedure return signals, conditional branch taken signals, conditional branch not taken signals, level-1 (L1) data cache access signals, L1 instruction cache access signals, level-2 (L2) data cache access signals, L2 instruction cache refill signals, bus access signals, bus cycle signals, external memory request signals, cache coherence data signals from another CPU, interrupt taken signals, clock signals) respectively corresponding to multiple system requests from multiple functional units in the chip, and the signal selection circuit 102 is configured to select a specific signal from the multiple system signals, where the specific signal corresponds to a specific system request. The signal counter 103 is configured to count a number of times of a specific system signal within the chip being sent (which may indicate a number of execution times of the specific system request), in order to generate a first counting result C1. The comparator 105 is configured to determine whether the first counting result C1 reaches a first threshold T1 in order to generate a first determination result D1, where the first threshold T1 may be set by writing a specific value into the register 104 from outside. The clock counter 106 is configured to count a number of cycles of an execution clock CLK (e.g. an execution clock of the CPU), in order to generate a second counting result C2. For example, execution of the specific system request may comprise operations in five cycles of the execution clock, and the clock counter 106 may count which cycle among the five cycles the execution of the specific system request has progressed to at a certain time point. The comparator 108 is configured to determine whether the second counting result C2 reaches a second threshold T2 (e.g. determining whether the specific system request has progressed to a specific cycle among the five cycles at a certain time point), in order to generate a second determination result. More particularly, when the first determination result D1 indicates that the first counting result C1 reaches the first threshold T1 and the second determination result D2 indicates that the second counting result C2 reaches the second threshold T2, the apparatus 10 may enable a trigger condition to make execution of the chip be suspended at a breakpoint state. When the trigger condition is enabled, the apparatus 10 may enable any of the scan chain 109, the memory interface 110 and the in-circuit debugger 111 according to a present situation, in order to execute further debug procedure(s) regarding the breakpoint state.

As an instruction of triggering the specific system request may be included in a loop procedure, if execution of the chip is controlled to be suspended as long as a specific value occurs in a program counter value or at any position on the bus, the execution of the chip will be repeatedly suspended when iterating the loop procedure, and therefore cannot be accurately suspended at a wanted breakpoint state. In addition, as a CPU, a cache memory, a bus, a static random access memory (SRAM), etc. may operate at different clock rates, an overall system is unable to be synchronized according to a clock of the CPU only. In addition, execution of each system request may require multiple cycles of the execution clock. Thus, when only counting the execution times of the system request (i.e. the times the corresponding system signal is sent), resolution may be insufficient. In order to overcome this, after selecting the specific system request, the present invention controls the number of execution times (e.g. an $N^{th}$ time execution of the specific system request) and the number of clock cycles after starting the specific system request (e.g. an $M^{th}$ clock cycle after starting the specific system request for the $N^{th}$ time) for determining a time point (e.g. a state) of suspending the execution of the chip.

Figure 2:
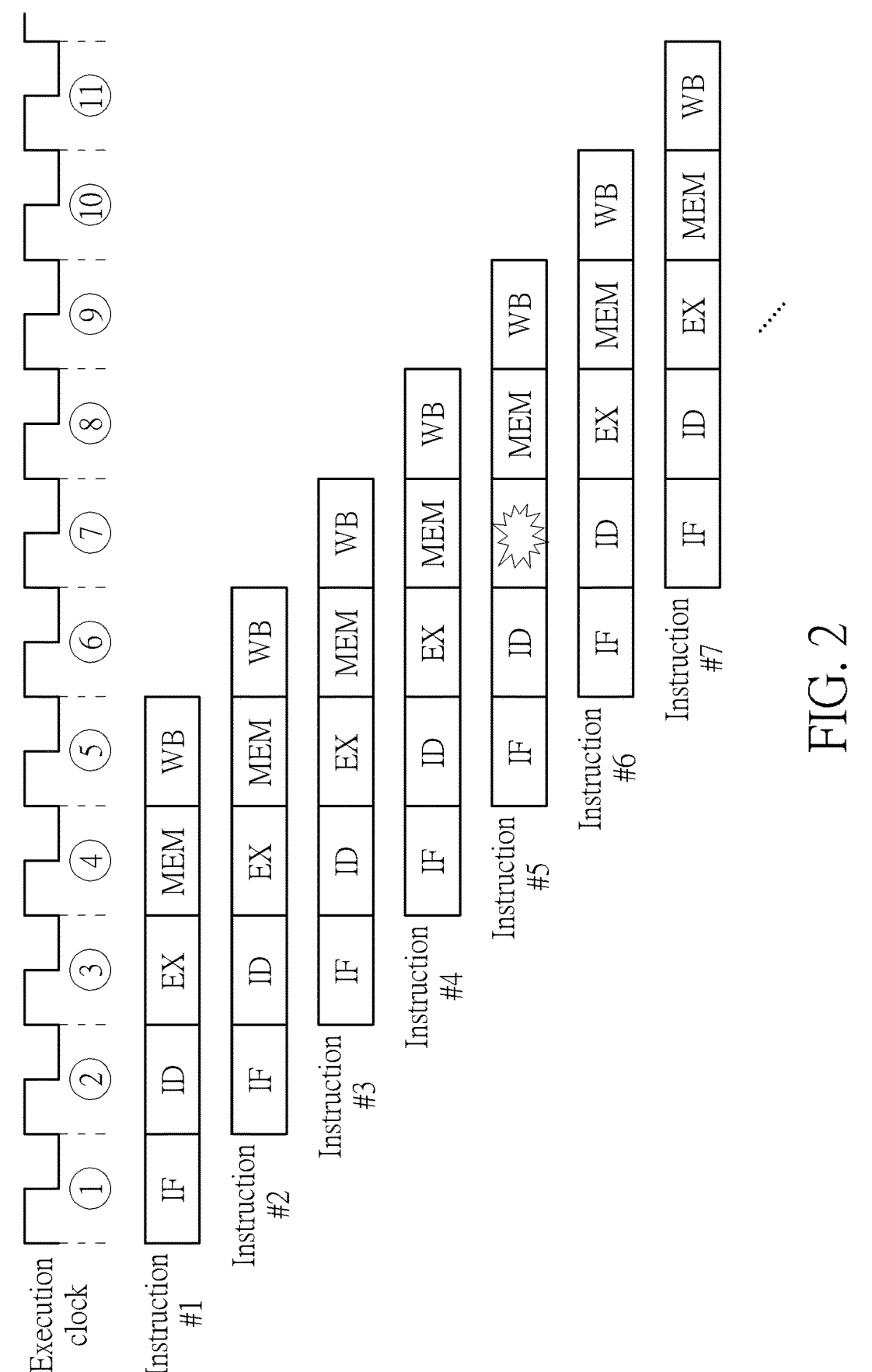
FIG. 2 is a diagram illustrating an error occurring in execution of a system request of the chip according to an embodiment of the present invention.

FIG. 2 is a diagram illustrating an error occurring in an executed instruction within the chip according to an embodiment of the present invention. The execution clock CLK is labeled "Execution clock" in FIG. 2, and a first time execution, a second time execution, a third time execution, a fourth time execution, a fifth time execution, a sixth time execution and a seventh time execution of the specific system request (e.g. a pipeline instruction execution) are labeled "Instruction #1", "Instruction #2", "Instruction #3", "Instruction #4", "Instruction #5", "Instruction #6" and "Instruction #7", respectively, where a first cycle, a second cycle, a third cycle, a fourth cycle, a fifth cycle, a sixth cycle, a seventh cycle, an eighth cycle, a ninth cycle, a tenth cycle, and an eleventh cycle of the execution clock CLK are labeled circles with numbers "1", "2", "3", "4", "5", "6", "7", "8", "9", "10" and "11" therein, respectively. In this embodiment, when a specific instruction is executed in a pipeline architecture manner, operations of the specific instruction may comprise five stages such as an instruction fetch stage (labeled "IF" in FIG. 2), an instruction decode stage (labeled "ID" in FIG. 2 for brevity), an instruction execution stage (labeled "EXE" in FIG. 2 for brevity), a memory access stage (labeled "MEM" in FIG. 2 for brevity) and a write back stage (labeled "WB" in FIG. 2 for brevity).

In some embodiments, when the apparatus 10 receives an error message, the signal counter 103 may be configured to count a number of times of receiving a specific signal associated with the error message according to the error message, in order to count a number of execution times of a system request corresponding to the specific signal. For example, when the error message received by the apparatus 10 at the seventh cycle of the execution clock shown in FIG. 2 is "undefined instruction code", the signal counter 103 may be configured to count a number of times of receiving an instruction fetch signal corresponding to an instruction fetch system request, in order to count a number of execution times of the instruction fetch (e.g. the instruction fetch system request). In addition, after the signal counter 103 is configured to count the number of times of receiving the instruction fetch signal corresponding to the instruction fetch system request, the instruction sequence (which comprises the instruction fetch system request) may be executed again, and the first counting result C1 generated by the signal counter 103 and the second counting result C2 generated by the clock counter 106 may be read out when the error message is received, in order to write the first counting result C1 and the second counting result C2 into the registers 104 and 107, respectively. Thus, the first threshold T1 may be determined according to a previous first counting result generated by the signal counter 103 at which the apparatus 10 receives the error message during a previous execution of the instruction sequence (e.g. the first counting result C1 generated by the signal counter 103 during the previous execution of the instruction sequence), and the second threshold T2 may be determined according to a previous second counting result generated by the clock counter 106 at which the apparatus 10 receives the error message during the previous execution of the execution of the instruction sequence (e.g. the second counting result C2 generated by the clock counter 106 during the previous execution of the instruction sequence), in order to set a state of the previous execution of the instruction sequence (e.g. previous execution of the chip) at which the apparatus 10 receives the error message to be the breakpoint state.

In addition, when the first determination result D1 indicates that the first counting result C1 reaches the first threshold T1, the clock counter 106 may start counting the number of cycles of the execution clock CLK in order to generate the second counting result C2. Thus, in the embodiment of FIG. 2, the first threshold T1 may be set as "5", and the second threshold T2 may be set as "3". When the specific instruction progresses to a fifth time fetch (a fifth cycle of the execution clock CLK shown in FIG. 2), the clock counter 106 may start counting. When the fifth time fetch of the specific instruction proceeds with a third cycle (a seventh cycle of the execution clock CLK shown in FIG. 2), the second determination result D2 generated by the comparator 108 may enable the trigger condition to suspend the execution of the instruction sequence at the breakpoint state.

In some embodiments, although the first threshold T1 may be determined according to the previous first counting result generated by the signal counter 103 at which the apparatus 10 receives the error message during the previous execution of the instruction sequence (e.g. the first counting result C1 generated by the signal counter 103 during the previous execution of the instruction sequence), the second threshold T2 cannot yet be accurately determined. Under this condition, the second threshold T2 may be sequentially set to multiple candidate thresholds (e.g. "1", "2", "3", "4" and "5") to make the execution of the instruction sequence sequentially suspended at multiple candidate breakpoint states. One of the multiple candidate thresholds may be selected to be the second threshold T2 according to the multiple candidate breakpoint states, to make the breakpoint state correspond to the error message received by the apparatus 10 during the previous execution of the instruction sequence. For example, by comparing the multiple candidate breakpoint states (e.g. a state of a first cycle of the specific instruction fetched a fifth time, a state of a second cycle of the specific instruction fetched a fifth time, a state of a third cycle of the specific instruction fetched a fifth time, a state of a fourth cycle of the specific instruction fetched a fifth time, a state of a fifth cycle of the specific instruction fetched a fifth time) with a state reported by the error message, the specific breakpoint state that matches the state reported by the error message from the multiple candidate breakpoint states can be found, and the threshold value corresponding to the specific breakpoint state may be utilized for determining the second threshold T2.

Figure 3:
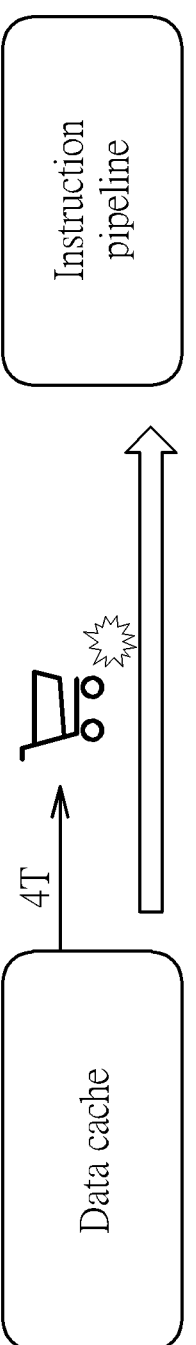
FIG. 3 is a diagram illustrating an error occurring in a data cache access system request of the chip according to an embodiment of the present invention.

FIG. 3 is a diagram illustrating an error occurring in a data cache access request of the chip according to an embodiment of the present invention. In detail, when the error message received by the apparatus 10 is "data abort", it may be suspected that the error occurs in a pipeline architecture at which data is transmitted to the CPU from the cache memory. Thus, the signal counter 103 may be configured to count a number of times of transmitting a data cache access signal corresponding to a data cache access system request, in order to count a number of execution times of the data cache access system request. More particularly, in a manner similar to the embodiment of FIG. 2, the first threshold T1 may be set as "8" and the second threshold T2 may be set as "4", to make the execution of the system signal be suspended at a fourth cycle (labeled "4T" in FIG. 3 for brevity) of an eighth time execution of the data cache access system request.

In particular, the apparatus 10 utilizes the number of execution times of the specific system request and the number of cycles of the execution clock CLK to control the state of suspending the execution of the chip. When the execution of the chip is suspended at the breakpoint, subsequent debug procedure(s) are not limited to specific manner(s). In some embodiments, when the first determination result D1 indicates that the first counting result C1 reaches the first threshold T1 and the second determination result D2 indicates that the second counting result C2 reaches the second threshold T2, the scan chain 109 which connects multiple flip-flops in series may be triggered (e.g. triggered by the second determination result D2), in order to output values of the multiple flip-flops at the breakpoint state. Taking the embodiment of FIG. 2 for illustration, when the execution of the instruction sequence is suspended at the third cycle of the fifth time fetch of the executed instruction (i.e. the instruction #5), values of the multiple flip-flops within the chip at this breakpoint state may be read out for usage of analysis and debugging. In some embodiments, when the first determination result D1 indicates that the first counting result C1 reaches the first threshold T1 and the second determination result D2 indicates that the second counting result C2 reaches the second threshold T2, the memory interface 110 may be triggered to capture data stored in a memory device coupled to the memory interface 110 at the breakpoint state. Taking the embodiment of FIG. 3 for illustration, when the execution of the chip is suspended at the fourth cycle of the eighth time execution of the data cache access system request, the memory interface 110 may read data of the cache memory at the breakpoint state for determination. In some embodiments, when the first determination result D1 indicates that the first counting result C1 reaches the first threshold T1 and the second determination result D2 indicates that the second counting result C2 reaches the second threshold T2, the in-circuit debugger 111 may be triggered to capture information of one or more registers within the apparatus 10 at the breakpoint state.

In some embodiments, the signal counter 103 and the clock counter 106 may be implemented by a counter circuit which is repeatedly used, and the comparators 105 and 108 may be implemented by a comparing circuit which is repeatedly used, where additional control units may be configured to record and control associated status, for example, recording and controlling the comparing circuit to serve as either the comparator 105 or 108, but the present invention is not limited thereto.

FIG. 4 is a diagram illustrating a working flow of a method for performing debug control in a chip according to an embodiment of the present invention, where the working flow may be executed by the apparatus 10 shown in FIG. 1.

It should be noted that one or more steps may be added, deleted or modified in the working flow shown in FIG. 4. In addition, if an overall result is not affected, these steps do not have to be executed in the exact order shown in FIG. 4.

In Step S410, the apparatus 10 may utilize a first counter (e.g. the signal counter 103) to count a number of execution times of a specific system request in the chip to generate a first counting result.

In Step S420, the apparatus 10 may utilize a first determination circuit (e.g. the comparator 105) to determine whether the first counting result reaches a first threshold to generate a first determination result.

In Step S430, the apparatus 10 may utilize a second counter (e.g. the clock counter 106) to count a number of cycles of an execution clock to generate a second counting result.

In Step S440, the apparatus 10 may utilize a second determination circuit (e.g. the comparator 108) to determine whether the second counting result reaches a second threshold to generate a second determination result.

In Step S450, in response to the first determination result indicating that the first counting result reaches the first threshold and the second determination result indicating that the second counting result reaches the second threshold, the apparatus 10 may suspend execution of the chip at a breakpoint state.

To summarize, the embodiments of the present invention can combine asynchronous control (e.g. counting the number of execution times of the specific system request) and synchronous control (e.g. counting the number of cycles of the execution clock CLK) for controlling the execution of the chip to be suspended at a designated breakpoint. In comparison with the related art, the present invention can greatly reduce the time for making the execution of the chip be suspended at the designated breakpoint. In addition, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for performing debug control in a chip, comprising:
   a first counter, configured to count a number of execution times of a specific system request in the chip to generate a first counting result;
   a first determination circuit, coupled to the first counter, configured to determine whether the first counting result reaches a first threshold to generate a first determination result;
   a second counter, coupled to the first determination circuit, configured to count a number of cycles of an execution clock to generate a second counting result; and
   a second determination circuit, coupled to the second counter, configured to determine whether the second counting result reaches a second threshold to generate a second determination result;
   wherein when the first determination result indicates that the first counting result reaches the first threshold and the second determination result indicates that the second counting result reaches the second threshold, execution of the chip is suspended at a breakpoint state.

2. The apparatus of claim 1, further comprising:
   a signal receiving circuit, configured to receive multiple system signals respectively corresponding to multiple system requests from multiple functional units in the chip; and
   a signal selection circuit, coupled to the signal receiving circuit, configured to select a specific signal from the multiple system signals, wherein the specific signal corresponds to the specific system request.

3. The apparatus of claim 2, wherein when the apparatus receives an error message, the first counter is configured to count a number of times of receiving the specific signal according to the error message, in order to count the number of execution times of the specific system request.

4. The apparatus of claim 1, wherein when the first determination result indicates that the first counting result reaches the first threshold, the second counter starts counting the number of cycles of the execution clock to generate the second counting result.

5. The apparatus of claim 1, wherein the first threshold is determined according to a previous first counting result generated by the first counter at which the apparatus receives an error message during a previous execution of the chip, and the second threshold is determined according to a previous second counting result generated by the second counter at which the apparatus receives the error message during the previous execution of the chip, in order to set a state of the previous execution of the chip at which the apparatus receives the error message to be the breakpoint state.

6. The apparatus of claim 1, wherein the first threshold is determined according to a previous first counting result generated by the first counter at which the apparatus receives an error message during a previous execution of the chip, and the second threshold is sequentially set to be multiple candidate thresholds to make the execution of the chip be sequentially suspended at multiple candidate breakpoint states, wherein one of the multiple candidate thresholds is selected to be the second threshold according to the multiple candidate breakpoint states, to make the breakpoint state correspond to the error message received by the apparatus during the previous execution of the chip.

7. The apparatus of claim 1, wherein when the first determination result indicates that the first counting result reaches the first threshold and the second determination result indicates that the second counting result reaches the second threshold, a scan chain which connects multiple flip-flops in series is triggered to output values of the multiple flip-flops at the breakpoint state.

8. The apparatus of claim 1, wherein when the first determination result indicates that the first counting result reaches the first threshold and the second determination result indicates that the second counting result reaches the second threshold, a memory interface coupled to a memory device is triggered to capture data stored in the memory device at the breakpoint state.

9. The apparatus of claim 1, wherein when the first determination result indicates that the first counting result reaches the first threshold and the second determination result indicates that the second counting result reaches the second threshold, an in-circuit debugger is triggered to capture information of the apparatus at the breakpoint state.

10. A method for performing debug control in a chip, comprising:

utilizing a first counter to count a number of execution times of a specific system request in the chip to generate a first counting result;

utilizing a first determination circuit to determine whether the first counting result reaches a first threshold to generate a first determination result;

utilizing a second counter to count a number of cycles of an execution clock to generate a second counting result;

utilizing a second determination circuit to determine whether the second counting result reaches a second threshold to generate a second determination result; and in response to the first determination result indicating that the first counting result reaches the first threshold and the second determination result indicating that the second counting result reaches the second threshold, suspending execution of the chip at a breakpoint state.

11. The method of claim 10, further comprising:

utilizing a signal receiving circuit to receive multiple system signals respectively corresponding to multiple system requests from multiple functional units in the chip; and utilizing a signal selection circuit to select a specific signal from the multiple system signals;

wherein the specific signal corresponds to the specific system request.

12. The method of claim 11, wherein utilizing the first counter to count the number of execution times of the specific system request in the chip to generate the first counting result comprises:

in response to the apparatus receiving an error message, utilizing the first counter to count a number of times of receiving the specific signal according to the error message, in order to count the number of execution times of the specific system request.

13. The method of claim 10, wherein utilizing the second counter to count the number of cycles of the execution clock to generate the second counting result comprises:

in response to the first determination result indicating that the first counting result reaches the first threshold, utilizing the second counter to start counting the number of cycles of the execution clock to generate the second counting result.

14. The method of claim 10, wherein the first threshold is determined according to a previous first counting result generated by the first counter at which the apparatus receives an error message during a previous execution of the chip, and the second threshold is determined according to a previous second counting result generated by the second counter at which the apparatus receives the error message during the previous execution of the chip, in order to set a state of the previous execution of the chip at which the apparatus receives the error message to be the breakpoint state.

15. The method of claim 10, wherein the first threshold is determined according to a previous first counting result generated by the first counter at which the apparatus receives an error message during a previous execution of the chip, and the second threshold is sequentially set to be multiple candidate thresholds to make the execution of the chip be sequentially suspended at multiple candidate breakpoint states, wherein one of the multiple candidate thresholds is selected to be the second threshold according to the multiple candidate breakpoint states, to make the breakpoint state correspond to the error message received by the apparatus during the previous execution of the chip.

16. The method of claim 10, further comprising:

in response to the first determination result indicating that the first counting result reaches the first threshold and the second determination result indicating that the second counting result reaches the second threshold, triggering a scan chain which connects multiple flip-flops in series to output values of the multiple flip-flops at the breakpoint state.

17. The method of claim 10, further comprising:

in response to the first determination result indicating that the first counting result reaches the first threshold and the second determination result indicating that the second counting result reaches the second threshold, triggering a memory interface coupled to a memory device to capture data stored in the memory device at the breakpoint state.

18. The method of claim 10, further comprising:

in response to the first determination result indicates that the first counting result reaches the first threshold and the second determination result indicates that the second counting result reaches the second threshold, triggering an in-circuit debugger to capture information of the apparatus at the breakpoint state.

* * * * *